United States Patent [19]

Bianco et al.

[11] Patent Number: 4,669,424
[45] Date of Patent: Jun. 2, 1987

[54] APPARATUS FOR AND METHOD OF REPELLING PESTS SUCH AS FLEAS AND TICKS

[76] Inventors: Frank J. Bianco, 11340 NW. 23rd St., Pembroke Pines, Fla. 33026; Oscar Jimenez, 5443 SW. 150 Ct., Miami, Fla. 33185

[21] Appl. No.: 742,232

[22] Filed: Jun. 7, 1985

[51] Int. Cl.⁴ .......................... A01K 29/00; H04B 1/02
[52] U.S. Cl. ...................................... 119/156; 367/139
[58] Field of Search ................. 119/29, 156; 367/139; 43/124

[56] References Cited

U.S. PATENT DOCUMENTS

| | | | |
|---|---|---|---|
| 3,328,908 | 7/1967 | Moe | 43/131 |
| 3,589,337 | 6/1971 | Doss | 119/29 |
| 3,753,421 | 8/1973 | Peck | 119/29 |
| 3,823,691 | 7/1974 | Morgan | 119/29 |
| 3,886,492 | 5/1975 | White | 340/15 |
| 3,891,962 | 6/1975 | White | 340/15 |
| 3,980,051 | 9/1976 | Fury | 119/29 |
| 4,178,578 | 12/1979 | Hall | 367/139 |
| 4,219,884 | 8/1980 | DeSantis | 367/139 |
| 4,562,561 | 12/1985 | Ackley | 367/139 |
| 4,566,085 | 1/1986 | Weinberg | 367/139 |

Primary Examiner—Hugh R. Chamblee

[57] ABSTRACT

Pests, such as fleas and ticks, are repelled from domestic animals, such as dogs and cats, by attaching an ultrasonic compressional wave energy source to the animal in such a position that a beam of the compressional wave energy is directed downwardly toward a surface on which the animal is located. Energy in the beam is reflected from the surface back to the animal. The energy has sufficient intensity, as reflected back to and incident on the animal, to repel the pests. The energy is pulsed on and off at a relatively low duty cycle at a rate above a predetermined minimum, such that during each pulse the envelope amplitude varies.

32 Claims, 9 Drawing Figures

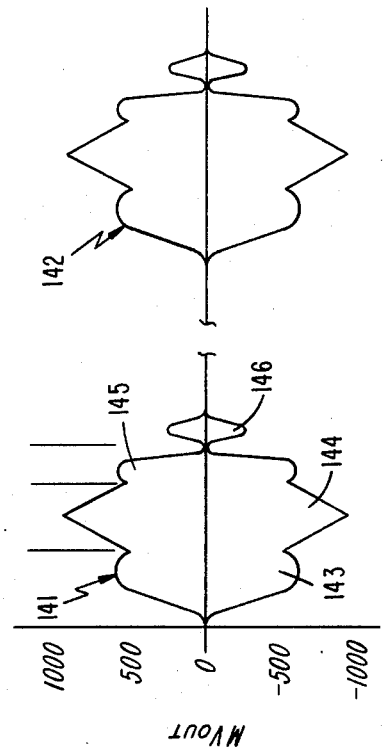
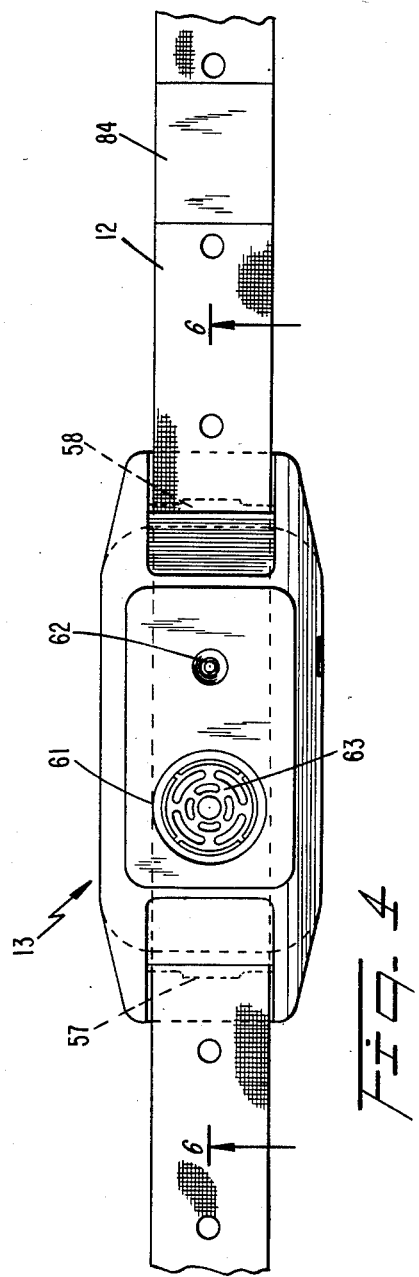

U.S. Patent Jun. 2, 1987 Sheet 3 of 3 4,669,424
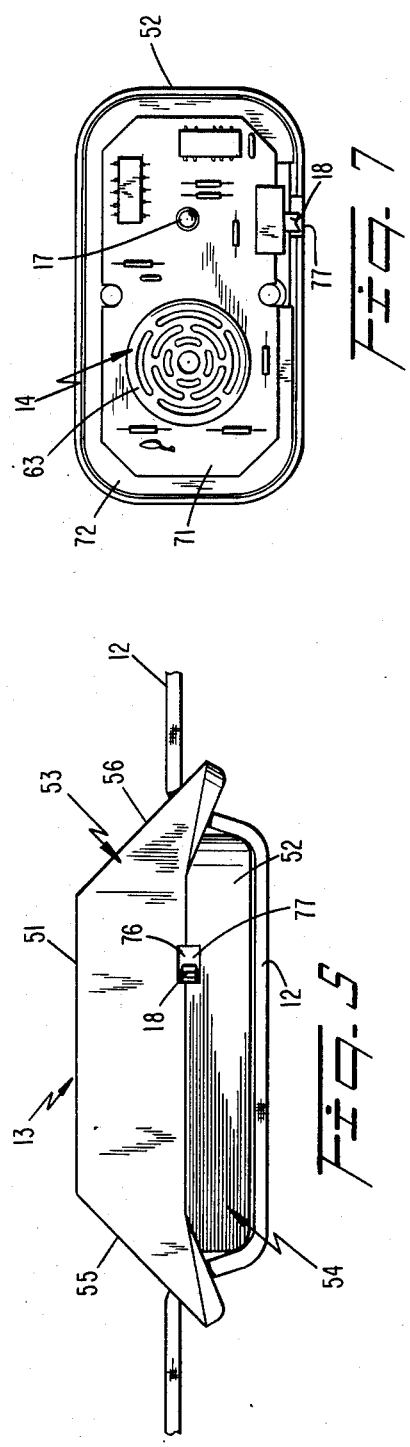
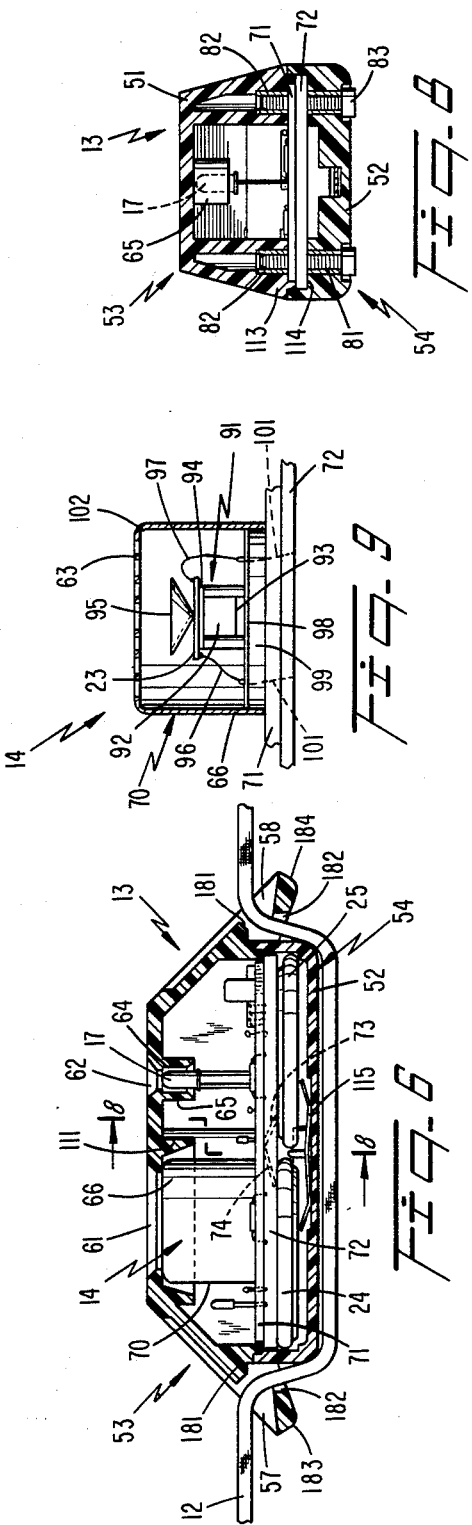

//4,669,424

APPARATUS FOR AND METHOD OF REPELLING PESTS SUCH AS FLEAS AND TICKS

TECHNICAL FIELD

The present invention relates generally to an apparatus for and method of repelling pests, such as fleas and ticks, and more particularly to a repelling method and apparatus wherein ultrasonic compressional wave energy is employed.

BACKGROUND ART

Numerous devices have been proposed and employed for the purpose of repelling pests, such as fleas, ticks and other similar creatures. One particular application of such devices is to rid domestic animals, such as dogs and cats, of these pests. One widely employed structure used for repelling these pests from the domestic animals has involved a chemical flea and tick collar. Generally, these chemical flea and tick collars have been ineffective, even though very large numbers are sold. While chemical baths are employed to kill fleas, ticks and other similar creatures from domestic animals, they are usually effective for a relatively short period and are not usually cost effective on a long term basis.

It has been suggested to control insects and other pests by using ultrasonic energy. Generally, these devices have attempted to supply sufficient ultrasonic energy to a region to be protected, so as to kill the pests. The energy required for such structures cannot be obtained for prolonged periods, e.g., several months, from battery operated devices which are capable of being mounted on a domestic animal such as a dog or cat. The volume and weight of the batteries necessary to power such structures are too large to provide the necessary power for the required time interval for a practical device.

It is, accordingly, an object of the present invention to provide a new and improved apparatus for and method of repelling pests from a region.

Another object of the invention is to provide a new improved apparatus for and method of repelling pests, such as fleas and ticks, from domestic animals, such as dogs and cats.

An additional object of the invention is to provide a new and improved apparatus for and method of repelling pests, such as ticks, fleas and other similar creatures, from domestic animals, such as dogs and cats, wherein a structure for repelling the pests is carried on the animal.

A further object of the invention is to provide a domestic animal pest repeller that is sufficiently small and light weight as to be adapted to be carried by a dog or cat.

A further object of the invention is to provide a pest repeller for domestic animals wherein the repeller is effective, portable, safe, and can be used for a relatively long time.

DISCLOSURE OF INVENTION

In accordance with one aspect of the invention, pests, such as fleas, ticks and other similar creatures, are repelled from a domestic animal, such as a dog or cat, by attaching an ultrasonic compressional wave energy source to the animal in such a position that a beam of the energy derived from the source is directed downwardly toward a surface on which the animal is located. Energy in the beam is reflected from the surface back to the animal. The energy has wave characteristics and sufficient intensity, as reflected back to and incident on the animal, to repel the pests.

In experiments we conducted, we found that the reflected energy incident on the domestic animal appears to repel the pests by agitating brain cells in the pest. The intensity of the reflected energy incident on the animal is not, however, sufficient to kill the pest. It appears that cells in the brain of the pest are agitated by the ultrasonic energy to cause the pest to undergo discomfort, similar to the discomfort a human undergoes when experiencing pain.

We found that the compressional wave energy preferably has a variable amplitude envelope. The energy is repetitively pulsed on and off at a rate that is above a predetermined level. The pulsing is at a relatively low duty cycle to conserve energy of a battery powering the ultrasonic compressional wave energy source. However, the duty cycle must exceed a certain value for the energy to repel the pests. Also, there is greater repulsion if the duty cycle is maintained at a relatively low value compared to a continuous wave. For ultrasonic energy having a carrier in the 35 KHz–45 KHz range, the duty cycle is preferably between 7% and 20%. In this frequency range, the effectiveness of the energy in repelling the pests drops almost to zero for duty cycles less than 7%. The repelling effectiveness in this frequency range with a 20% duty cycle and 80 dB compressional wave output has been found to be the same as at 90 dB for continuous wave energy.

In one preferred embodiment, the pulse envelope includes three continuous zones; during the initial zone, the envelope amplitude increases from a starting, zero value to a median value; during the second zone, the envelope amplitude ramps upwardly and downwardly between the median value and a peak; and during the third zone, the envelope amplitude quickly returns to a zero level from the median value. As a further feature, the pulse repetition frequency is at an audio frequency for enabling a human to determine whether the device is operating. In the tests we performed, this audio frequency has a sufficiently low amplitude as to have no adverse effect on the domestic animal carrying the compressional wave source. The higher amplitude carrier frequencies are above the acoustic response range of the domestic animals, hence cannot be heard by the animals and do not annoy them.

By reflecting the ultrasonic compressional wave energy from a surface beneath the animal, a relatively large area on the animal is protected against the pests. The ultrasonic compressional wave source is conveniently mounted on a collar that fits around the neck of the domestic animal. The compressional wave beam from the ultrasonic source typically is reflected from the ground where the animal is standing or sitting, to the under parts of the animal where the pests are most likely initially to be located on the animal. Prior to the pests becoming invasive over the entire domestic animal, they are driven away by the repelling action of the ultrasonic compressional wave energy. We have found that even those animals which are completely infested with the pests are usually ridden of the pests within a few days or weeks.

In accordance with still another aspect of the invention, an apparatus for repelling pests, such as fleas, ticks and other similar creatures, comprises an electric wave to compressional wave transducer designed to resonate at frequencies in the ultrasonic spectrum to produce the carrier waves. For portable applications, such as pest protection, the resonant transducer is preferably a piezo electric device; for other situations where the efficiency in converting electric energy to compressional wave energy is not as critical as for the portable application, an electromagnetic transducer, e.g., a speaker having a moving coil, can be used. The transducer is connected in a circuit with a resistance-capacitor shaping circuit and a load resistor that determines the magnitude of the compressional wave output of the transducer. The crystal, shaping circuit and load resistor are connected to selectively opened and closed electronic switching means. The circuit includes sufficient positive feedback while the switching means is closed to cause the transducer to resonantly oscillate at frequencies in the ultrasonic spectrum. The switching means is closed with a duty cycle that is substantially less than 50% to provide the pulsing action. The transducer is in a resonant cavity that is matched to a certain extent to the resonant frequency of the transducer. The resonant cavity, resonant transducer and shaping circuit interact causing each pulse of the ultrasonic compressional wave energy emitted from the cavity to have an envelope with different amplitudes during different segments. The particular envelope amplitude variations have been found to be particularly effective in repelling the pests. Because each transducer device oscillates at an intrinsic resonant frequency, maximum output is attained thereby automatically without the use of a trimmer resistor.

The above and still further objects, features and advantages of the present invention will become apparent upon consideration of the following detailed description of one specific embodiment thereof, especially when taken in conjunction with the accompanying drawings.

BRIEF DESCRIPTION OF DRAWINGS

FIG. 3 is an illustration of the waveform derived from an ultrasonic transducer included in the circuit of FIG. 2;

FIG. 4 is a plan view of a preferred embodiment of the invention;

FIG. 5 is a side view including a switch for controlling operation of the preferred embodiment of the invention;

FIG. 6 is a longitudinal side sectional view of the device taken through the line 6—6, FIG. 4;

FIG. 7 is a plan view of the device illustrated in FIGS. 4–6, with a top cover half removed;

FIG. 8 is a side sectional view taken through the line 8—8, FIG. 6; and

FIG. 9 is a side view of a resonator included in the device illustrated in FIGS. 4–7.

BEST MODE FOR CARRYING OUT THE INVENTION

Figure 1:
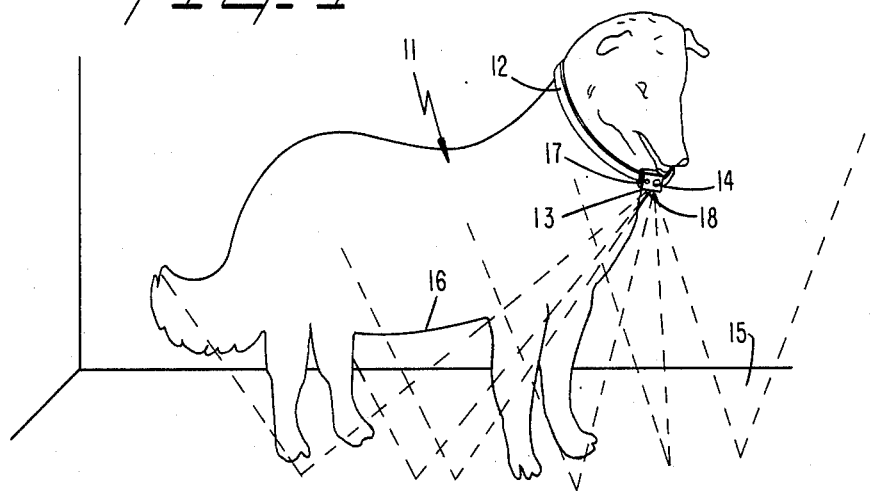
FIG. 1 is a view of the invention as affixed to a dog.

Reference is now made to FIG. 1 of the drawing wherein dog 11 is illustrated as including a neck collar 12 on which is mounted case 13. Contained in case 13 are an ultrasonic electric signal to compressional wave transducer 14, in the form of a piezo electric crystal mounted in a resonant cavity. Transducer 14 is driven by electronic circuitry contained in case 13 and powered by lithium dry cell batteries also contained in the case. Case 13 is placed on collar 12 around the neck of dog 11 so that ultrasonic compressional waves derived from transducer 14 are directed downwardly away from the dog. The ultrasonic compressional waves are directed in a wide angle beam toward surface 15 on which dog 11 is standing, sitting or lying.

The energy in the compressional wave beam derived from transducer 14 is reflected from surface 15 on which dog 11 is standing so that the angle of incidence of the beam impinging on surface 15 is equal to the angle of reflection. Thereby, the ultrasonic compressional wave energy reflected from surface 15 is incident on virtually all of the under parts 16 of dog 11. It has been found that the specific embodiment described infra provides an effective coverage area having a total length of approximately eight feet, with the center of the area of coverage being approximately directly below case 13. By reflecting the energy of transducer 14 from surface 15, a large coverage area consistent with the under parts of dog 11 is conveniently provided.

The reflected ultrasonic compressional wave energy incident on dog 11 is preferably pulsed at a rate in the audio range of 20 to 300 cycles per second with a relatively low duty cycle of less than 50%, preferably in the range of about 7% to 30%. Each compressional wave pulse derived from transducer 14 has a single ultrasonic frequency, preferably in the 35 KHZ–45 KHz range, with a variable amplitude. In tests that we have actually performed we have found these parameters to be effective in repelling ticks, fleas and other similar creatures from a very high percentage of dogs who have had the device within case 13 applied to them.

We found that if the pulse rate is less than about 20 cycles per second, the pest repulsion rate decreases considerably. Also, a pulse rate of less than 20 Hz is not generally perceivable to the human ear to prevent aural techniques from being used to test whether a circuit is operating. Our experiments also indicate that the pulsed low duty cycle variations (maximum of about 30%) considerably add to the effectiveness of the device in repelling these objectionable pests relative to continuous wave energy. If the duty cycle drops below about 7%, the pest repulsion effectiveness falls virtually to zero. The low duty cycle also reduces the power requirements for the electronic circuitry in case 13 that drives transducer 14. We also found that the variable amplitude, ultrasonic carrier frequency in the 35 to 45 KHz range of each pulse is considerably more effective in repelling the pests than the use of a single carrier frequency having a constant amplitude or of multiple frequencies having a constant amplitude. In addition, the 35 to 45 KHz frequency range is above the range which can be perceived by the ears of domestic animals, such as dogs and cats, so that the animal is not annoyed by the ultrasonic compressional wave energy emitted by transducer 14. While the power emitted from transducer 14 and reflected back to dog 11 is not adequate to kill the pests on the dog, it is sufficient to repel the pests from the dog. In experiments we conducted we found that the pests can be killed only if approximately 500 milliamperes are supplied to the electronic circuitry which powers transducer 14. This is not a practical current dissipation level for a portable battery powered product, such as must be included in case 13, for effective use over a several month period. The specifically illustrated embodiment of the invention has been found through actual use to achieve these standards.

A further feature of the invention is that a human can easily perceive whether the electronic circuitry in case 13 is properly operating and whether the batteries energizing the electronic circuit which drives transducer 14 have sufficient power to repel the pests on dog 11. The audio frequency tone derived from transducer 14 can be heard by the vast majority (approximately 85%) of humans if the transducer is placed between 3 and 6 inches from the human ear. Thereby, the vast majority of humans can conveniently detect if the electronic circuitry in case 13 is properly activating transducer 14. The intensity level of the ultrasonic compressional wave energy derived by transducer 14 is selectively, inferentially determined as being adequate since a light source, in the form of light emitting diode 17, is mounted on case 13. If the batteries powering the electronic circuitry which drives transducer 14 have adequate power to provide the pest repulsion function, light emitting diode 17 is energized when slide switch 18 on the side of case 13 is properly positioned to a test position from a normal position where the battery power supply in the case is disconnected from the diode. If, however, the batteries do not have adequate energy to provide the repulsion function, activation of slide switch 18 to the test position does not result in energization of light emitting diode 17 and the human is advised that it is necessary to replace the batteries.

Figure 2:
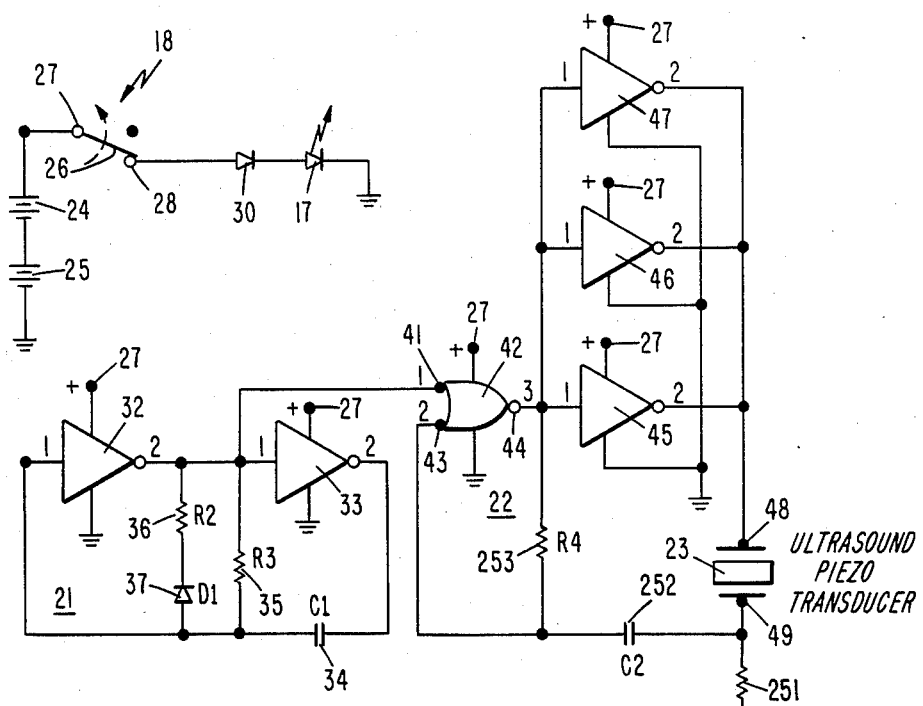
FIG. 2 is a circuit diagram of the electronic portion of the preferred embodiment of the invention.

Reference is now made to FIG. 2 of the drawing, a circuit diagram of the electronic elements included in case 13 to drive transducer 14. The circuit basically includes an astable oscillator 21 which pulses ultrasonic oscillator 22 on at a relatively low duty cycle in the 7% to 30% range in a periodic manner at a frequency in the range of 20 to 300 Hz. Ultrasonic oscillator 22 includes piezo electric ceramic electrical-to-compressional wave crystal or element 23 of the bimorph-type having a natural resonant frequency in the ultrasonic range from 35 KHz to 45 KHz. Crystal or element 23 is mounted in an ultrasonic resonant cavity (described infra); the crystal and cavity together comprise transducer 14.

Oscillators 21 and 22 include active elements energized by a 6 volt DC power supply formed by series-connected lithium batteries 24 and 25. The active elements in oscillators 21 and 22 are semiconductor amplifying devices of the integrated circuit type mounted on a circuit board in case 13. Batteries 24 and 25 continuously supply power via terminal 27 to the elements in oscillators 21 and 22 and selectively supply power to light emitting diode 17 by way of switch contacts 26 and 28 that are opened and closed in accordance with the position of slide switch 18 on case 13.

To test the voltage of the power supply comprising batteries 24 and 25, slide switch 18 is translated to cause engagement of contacts 26 and 28 and provide power to light emitting diode 17 by way of blocking diode 30. In response to the voltage across the power supply comprising batteries 24 and 25 being adequate to power the active elements in oscillators 21 and 22, sufficient voltage is supplied by the batteries to light emitting diode 17 to cause the diode to be energized to a light emitting state. If, however, the voltage of the supply comprising batteries 24 and 25 drops below a level which enables adequate power to be supplied to crystal 23 to repel fleas, ticks and other pests from dog 11, light emitting diode 17 is not activated when contacts 26 and 28 are engaged.

Astable oscillator 21 is of the resistance-capacitance type, including cascaded inverting amplifiers 32 and 33, having power supply terminals connected to terminal 27. Amplifier 33 has an output terminal coupled to one electrode of capacitor 34, having a second electrode connected directly to an input terminal of amplifier 32. A common terminal for the output of amplifier 32 and the input of amplifier 33 is connected to the input of amplifier 32 by way of resistor 35, shunted by the series combination of resistor 36 and diode 37. Diode 37 is a steering diode causing an asymmetrical cycle. During the first part of the cycle, while the output of inverter 32 has a high logic value, diode 37 is reverse biased, preventing current flow through resistor 36, thus sterring current through resistor 35. During the second part of each cycle, while the output of amplifier 32 has a low logic level, diode 37 is forward biased, causing resistors 35 and 36 to be in parallel with each other, to cause a shorter second cycle portion. Resistors 35 and 36 and capacitor 34 are the primary frequency determining elements of oscillator 21. At the common terminal for the output of amplifier 32 and the input of amplifier 33 are derived periodic pulses having a frequency in the range of 20 to 300 Hz, and a duty cycle in the range of 7% to 30%. Typically, the pulses of oscillator 21 have a repetition frequency of 100 Hz and a duty cycle of 20%. Thus, each complete pulse cycle has a duration of 10 milliseconds, such that the pulses at the output of amplifier 32 have a binary zero value for 8 milliseconds and a binary one value for 2 milliseconds.

The binary zero and one levels at the output of amplifier 32 are coupled to input terminal 41 of NOR gate 42 that controls oscillator 22. In response to binary zero and one levels being respectively supplied by amplifier 32 to terminal 31, oscillator 22 is activated into de-energized and energized states. NOR gate 42 includes active elements and therefore is connected to terminal 27. NOR gate 42 includes a second input terminal 43 and output terminal 44. The voltage at output terminal 44 of NOR gate 42 is supplied to input terminals of inverter amplifiers 45–47, which are connected in parallel with each other and have power supply terminals connected to terminal 27. Each of amplifiers 45–47 has a parasitic output shunt capacitance which affects the shape of each output pulse of transducer 14. The combined outputs of amplifiers 45–47 are applied in parallel to electrode 48 of crystal 23, having a second electrode 49 connected to ground through resistor 251. Electrode 49 is also connected to one electrode of coupling capacitor 252, having a second electrode connected directly to input terminal 43 of gate 42 and to one terminal of resistor 253, having a second terminal connected to output terminal 44 of NOR gate 42. The magnitudes of the resistance of resistor 251 and the capacitance value of output parasitic capacitance of amplifiers 45–47 as well of capacitor 252 are primary determinates for the shape of each pulse derived from transducer 23, while the amplitude of the envelope of each pulse is determined primarily be the resistance value of resistor 253.

In response to a binary one signal coupled by the output of amplifier 32 to terminal 41 of NOR gate 42 a positive feedback network is provided between terminals 48 and 49 of crystal 23, causing AC current to flow in oscillator 22, whereby the crystal resonates at a frequency in the ultrasonic range between 35 KHz and 45 KHz. The resonant frequency oscillations have differing variable AC amplitudes as a function of time, during the interval while a binary one level is supplied by oscillator 21 to gate terminal 41. AC current flow in oscillator 22 is prevented while amplifier 32 derives a binary zero output signal since the path through NOR gate 42 is thereby open circuited. Because NOR gate 42 controls whether or not AC current flows in oscillator 22, the quiescent DC current in inverters 45–47 is maintained at a much lower level than if the inverters were biased on and off directly in response to the output of oscillator 21. Thereby, the current drain required by oscillator 22 is minimized.

In response to zero to one and one to zero transitions at the output of amplifier 32 there are respectively one to zero and zero to one transitions at the outputs of gate 42 and inverters 45–47. The zero to one transition at the outputs of inverters 45–47 causes a positive voltage pulse to be supplied by the inverters to electrode 48 of crystal 23. Crystal 23 therefore begins to oscillate at the natural resonant frequency thereof. The oscillations are coupled back to input terminal 23 of gate 42 by way of capacitor 252 to provide a regenerative oscillator. The resonant compressional wave oscillations of crystal 23 are coupled to the ultrasonic resonant chamber in which the crystal is located. Because of the charge and discharge characteristics of capacitor 252 and resistor 251 the amplitude of the crystal and compressional wave energy varies during each activation of gate 42 into an active state. The natural resonant frequencies of crystal 23 and the chamber thus control the frequency of oscillator 22, making the oscillator frequency practically insensitive to changes in the voltage of batteries 24 and 25 and ambient temperature.

The waveform of the compressional wave, acoustic energy derived from crystal 23 for the circuit arrangement and the component values illustrated in FIG. 2 is illustrated in FIG. 3. In FIG. 3 are illustrated two successive and identical envelopes 141 and 142 of the pulsed ultrasonic compressional wave energy derived from transducer 14 that includes crystal 23 and the resonant chamber. Pulse envelopes 141 and 142 each have a duration of 2 milliseconds and are spaced from each other so that the beginning of pulse envelope 142 occurs 8 milliseconds after the end of pulse envelope 141. The relative lengths of the on-off intervals and the frequency of the pulses are determined by the relative durations of the binary one and zero levels and the frequency at the output of oscillator 21. The lengths of zones 143–145 are determined primarily by the values of resistor 251 and capacitor 252. The shapes and carrier waves within pulse envelopes 141 and 142 are identical, whereby a description of pulse envelope 141 suffices.

Pulse envelope 141 includes four successive zones 143, 144, 145 and 146 each having the same carrier frequency but different amplitude variations. The different amplitudes in zones 143–146 occur because of the charge-discharge characteristics of the parasitic output capacitance of inverter amplifiers 45–47, capacitor 152 and resistor 151 in the positive feedback circuit, including crystal 23 and gate 42; the oscillating frequency is determined by the resonant frequencies of crystal 23 and the resonant chamber, and as well as the coupling between resonant characteristics of the crystal and the chamber. The oscillating frequency is in the 35 KHz–45 KHz range with a typical value of about 40 KHz. It has been found that this is the most effective frequency range for the flea and tick repulsion application.

In zone 143 pulse envelope 141 initially has a zero value, then rises in a non-linear sinusoidal-like manner to a peak value and then decreases in a sinusoidal-like manner slightly beyond the peak value until zone 144 is instigated. In zone 144, the envelope of pulse 141 initially starts at the same value as the final value of the pulse envelope in zone 143. The amplitude of the envelope of the pulse in zone 144 increases steadily in a linear-like manner until it reaches a peak value in the center of zone 144. The amplitude of the envelope in zone 144 then decreases steadily in a linear-like manner, back to about the same value, at about the median of pulse 141, it had at the beginning of zone 144. The amplitude of the envelope in zone 145 initially has the same value as the amplitude of the envelope at the end of zone 144. The envelope in zone 145 increases in a sinusoidal-like manner to a maximum value which is approximately the same as the maximum value as the peak value of the envelope in zone 143. Thereafter, the envelope in zone 145 decreases rapidly to a zero value in a non-linear sinusoidal-like manner. The ultrasonic frequency in zone 146 has an envelope that is characteristic of the usual AM envelope of a tone modulating an RF carrier. However, the envelope amplitude in zone 146 is probably too low to have an effect on the pests.

The illustrated envelopes in FIG. 3 are for a piezo electric crystal. If an electromagnetic transducer, e.g., a moving coil speaker, is used instead of a crystal the increased reactance thereof causes a slight change in the wave shape. More importantly, it has been found that the piezo electric crystal more efficiently converts the electric energy into compressional wave energy than the electromagnetic transducer. We have found that units having piezo electric crystals typically require battery changes of about once every six months. However, the power supplied to an electromagnetic transducer is considerably greater, requiring battery changes of about every two to four weeks.

We have found that the wave shape of FIG. 3 is particularly advantageous compared to other wave shapes which have been synthesized. In particular, tests conducted with pulses having constant amplitude and frequency provided considerably poorer results than are attained with the variable amplitude pulses of FIG. 3. Tests were also conducted with pulses having constant amplitude carriers at different frequencies. These tests indicated that the results attained by the waveform of FIG. 3 could be achieved only with a 10 dB higher power level than is necessary for the pulses of FIG. 3; of course, this has an adverse effect on battery life. It was found that the 35 KHz–45 KHz carrier pulses of FIG. 3 could provide effective pest repulsion if the compressional wave energy derived from transducer 14 has an 80 dB level; to obtain the same repulsion effect with pulses having substantially constant amplitude envelopes and a frequency in the 35 KHz–45 KHz range, it was necessary for the resonator to produce compressional waves at 95 dB. The 80 dB compressional wave output of transducer 14 is provided by a 40 microampere DC output current of the power supply comprising batteries 24 and 25; this current level enables the power supply comprising batteries 24 and 25 to have an approximately six-month life.

Reference is now made to FIGS. 4–8 wherein details of the actual construction of a preferred configuration for case 13 are illustrated. Case 13 is shaped similar to a trapezoid, having parallel exterior walls 51 and 52 on front and back halves 53 and 54, respectively. Front half 53 includes sloping side faces 55 and 56 in which are respectively located slots 57 and 58 for receiving collar strap 12. Strap 12 extends through slots 57 and 58 so that opposite sides of the strap respectively abut against the outside face of wall 52 and against the neck of dog 11; the collar strap surrounds and is held together on the neck of the dog by a fastener, not shown.

Circular openings 61 and 62 are provided in wall 51. Resonator 14 and light emitting diode 17 are respectively located below circular apertures 61 and 62 so the acoustic compressional wave energy of the resonator is propagated through aperture 61 and light energy from diode 17 is transmitted through aperture 62. Resonator 14 includes a thimble-like metal housing 70 comprising vertically extending cylindrical wall 66, topped by horizontally extending grill 63 which fits into aperture 61. Wall 66 and grill 63 are coaxial with aperture 61, with each having a diameter slightly greater than that of the aperture; the upper face of grill 63 bears against the ceiling of wall 51, having downwardly dependent circular flange 111 that confines wall 66. Light emitting diode 17 is captured in cavity 64 formed integrally with wall 51; cavity 64 is formed within hollow cylinder 65 which extends downwardly from wall 51.

Resonator 14 is fixedly mounted on printed circuit board 71 on which are mounted electrical components and cases for the integrated circuits indicated by the circuit diagram of FIG. 2. Wires (not necessarily shown) extend from printed circuit board 71 to terminals 48 and 49 of piezo electric crystal 23 and to the terminals of light emitting diode 17 in cavity 64. Printed circuit board 71 is mounted on plastic closed cell foam gasket 72 which functions as a shock absorber, as well as a support, for the printed circuit board as well as a water repeller for batteries 24 and 25 because it tends to prevent the migration of water to the batteries. Gasket 72 fills the residual space between circuit board 71 and batteries 24 and 25 to hold batteries 24, circuit board 71, and resonator 14 in place. Circuit board 71 and gasket 72 are secured in place by pinching forces exerted on them in a gap between downwardly depending ear 113 on case half 53 and shelf 114 on case half 54. Downwardly depending from printed circuit board 71 through gasket 72 are metal terminal spring tabs 73 and 74 which bear against opposite polarity electrodes on the tops of flat circular batteries 24 and 25, carried in side-by-side relationship in back half 54. The other electrodes on the bottoms of batteries 24 and 25 are connected in series by metal spring tab 115, secured to the interior face of wall 52 so it is urged against the bottom faces of the batteries.

On the side walls of front and back halves 53 and 54 are mating aligned slots 76 and 77 to form a single slot for receiving slide switch 18. Slide switch 18 is carried by printed circuit board 71 and includes a metal contactor that selectively bridges aligned tabs on opposite faces of printed circuit board 71. In the normal position, slide switch 18 is adjusted so that a metallic U-shaped portion carried thereby does not bridge the tabs. The aligned tabs on opposite faces of print circuit board 71 are extensions of printed circuit leads on the board, which leads are connected to terminals for tabs 73 and 74 that are connected to opposite polarity electrodes of batteries 24 and 25. When it is desired to test the power supply comprising batteries 24 and 25, slide switch 18 is translated so it engages the previously mentioned tabs on printed circuit board 71 to connect light emitting diode 14 to batteries 24 and 25.

To secure back half 54 to front half 53, the back half is provided with circular bores 81 (FIG. 8) that extend through wall 52 at a position equi-distant from end walls 55 and 56, and adjacent the side edges of wall 52. Bores 81 are aligned with corresponding threaded bores 82 in front half 53. Allen head bolts 83 extend through bores 81 and are threaded into bores 82, to hold front and back halves 53 and 54 securely in place and provide adequate contact forces between tabs 73, 74, 115 and the faces of batteries 24 and 25 against which they bear.

Slots 57 and 58 are shaped to help prevent relative movement between collar strap 12 and case 13. The upper surfaces of slots 57 and 58 include lips 181 that cooperate with sharp edges 182 along the bottom surfaces of the slots. Relative movement of case 13 and strap 12 is also prevented because of the trapezoidal-like shape of the case, particularly the cooperation between the outer face of wall 52 and the downwardly depending ears 183 and 184 in which slots 57 and 58 are located. It has been found by actual tests that case 13 resists movement relative to strap 12 even when the case is disturbed by an external agent, such as a paw of dog 11.

Strap 12 is preferably made of meltable braided nylon fabric. At spaced regions 84 (FIG. 4) along the length of strap 12 the nylon is fused. It has been found that the fused melted braided nylon fibers are easily cut, to enable the length of collar 12 to be easily controlled for animals having necks of different sizes.

Reference is now made to FIG. 9 of the drawing, a side sectional view of transponder 14, including piezo electric crystal 23 and the acoustic resonant cavity to which it is coupled. Crystal 23 is mounted on dielectric pedestal 91, configured as a hollow cylinder that is bonded to bottom and top dielectric slabs 93 and 94. Crystal 23 is configured as a disc, having a bottom face bonded at the center thereof to the center of circular slab 94. The center of the top face of crystal 23 is bonded to the apex of aluminum cone 95, having a circular aperture in a plane parallel to the faces of the crystal. On the opposite faces of crystal 23 are coated metal regions (not shown) forming electrodes 48 and 49 to which leads 96 and 97 are bonded. The entire bottom face of dielectric circular slab 93 of pedestal 91 is bonded to circular dielectric slab 98 having a diameter greater than that of cylinder 92; slab 98 functions as a reflector for the compressional wave energy which is derived in response to crystal 23 being electrically actuated by the voltage applied between electrodes 48 and 49 by leads 96 and 97. Dielectric slab 98 has a bottom face which abuts against and is bonded to a top face of circular aluminum base 99, having the same area as dielectric disc slab 98. Aluminum base 99 does not oscillate at a frequency in the ultrasonic range because (1) it is decoupled from the compressional wave energy by the reflecting action of slab 98 and (2) the shape and mass of aluminum base 99 cause it to have a resonant frequency much lower than the frequency of compressional wave energy derived by transducer 14. Extending through slab 98 and base 99 are electric leads 101 which are connected by appropriate terminals (not shown) on slab 98 to wires 96 and 97. Leads 101 are connected to the output terminal of amplifier 45 and to the common terminal for resistor 251 and capacitor 252 (FIG. 2), on circuit board 71.

Bonded to the top face of dielectric compressional wave energy reflecting slab 98 is the bottom edge of hollow aluminum cylinder 66 of thimble 70. Thimble 70, cone 95, crystal 23, and pedestal 91 form a relatively high Q acoustic resonant chamber. Because of the manner in which crystal 23 is mounted and electrodes 48 and 49 are coated on the crystal, the crystal flexes about a center region thereof, along a common axis for the centers of thimble 70, pedestal 91, discs 98 and 99, and cone 95. The natural resonant frequency of this acoustic chamber is approximately the same as the natural resonant frequency of crystal 23. Crystal 23 oscillates basically in a bending mode about its central axis. The configuration of pedestal 91, i.e., a hollow cylinder with a circular top slab 94 for mounting crystal 23, provides greater flexture for the crystal than any other shape, to assist in maximizing the output power of transducer 14.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of repelling pests, such as fleas, ticks and other similar creatures, from a four-legged domestic animal, such as a dog or cat, comprising the step of attaching an ultrasonic compressional wave energy source to the animal in such a position that a beam of the energy derived from the source is directed downwardly toward a surface on which the animal is located and energy in the beam is relfected from the surface back to the animal, the energy having wave characteristics and sufficient intensity as reflected back to and incident on the animal to repel the pests.

2. The method of claim 1 wherein the energy is repetitively pulsed on and off at a rate above a predetermined minimum that enhances repelling of the pests.

3. The method of claim 2 wherein each pulse has an envelope with different amplitudes.

4. The method of claim 3 wherein the pulse has a carrier frequency in the 35-45 KHz range.

5. The combination of claim 2 wherein the ultrasonic energy has a carrier frequency in the 35 KHz-45 KHz range.

6. The combination of claim 5 wherein the energy is pulsed at a duty cycle in the 7%-30% range.

7. The method of claim 2 wherein the energy is continuously pulsed on and off at a rate of between 20 and 300 times per second.

8. The method of claim 7 wherein each pulse has an envelope with a first portion that rises in a sinusoidal-like manner from an initial zero value to an intermediate value, a second portion that rises in a linear-like manner from the intermediate value to a peak value and then falls in a linear-like manner to a middle value, and a third portion that falls in a sinusoidal-like manner from the middle value to zero.

9. The method of claim 7 wherein the pulses have a duty cycle in the 7% to 30% range.

10. A method of repelling fleas from a region comprising the step of continuously irradiating the region with pulses of ultrasonic compressional wave energy having (a) a duty cycle between 7% and 30%, (b) a pulse on and off rate of between 20 and 300 times per second that enhances repelling of the fleas and (c) an intensity and ultrasonic carrier frequency such that fleas are repelled from the region.

11. The method of claim 10 wherein the carrier frequency is in the 35-45 KHz range.

12. The method of claim 10 wherein each pulse has an envelope with different amplitudes.

13. The method of claim 10 wherein each pulse has an envelope with a first portion that rises in a sinusoidal-like manner from an initial zero value to an intermediate value, a second portion that rises in a linear-like manner from the intermediate value to a peak value and then falls in a linear-like manner to a middle value, and a third portion that falls in a sinusoidal-like manner from the middle value to zero.

14. The method of claim 10 wherein the energy is continuously pulsed on and off at a rate of about 100 Hz.

15. The method of claim 10 wherein the energy is continuously pulsed on and off at a rate of about 100 Hz.

16. In combination, a collar strap for the neck of a four-legged domestic animal, such as a dog or cat, a device on the collar strap for repelling objectionable pests such as fleas, ticks and/or other similar creatures from the animal, the device including a source of ultrasonic compressional wave energy positioned on the collar so the wave energy is directed as a beam toward a surface beneath the animal so that wave energy in the beam is reflected from the surface back toward the animal, the energy derived from the source having wave characteristics and sufficient energy when incident on the animal after having been reflected to repel the pests.

17. The combination of claim 16 wherein the strap is fabricated from braided nylon fibers having at least one fused segment adapted to be severed to control the strap length.

18. The combination of claim 16 wherein the device includes: a DC battery power supply for the energy source, a voltage responsive light source, and switch means for selectively connecting the light source and supply to each other, the light source and switch means being arranged so that light is emitted by the light source in response to the switch means connecting the supply to the energy source and the supply having sufficient voltage to drive the energy source.

19. The combination of claim 16 wherein the resonant chamber resonates at the frequency of the compressional wave energy.

20. The combination of claim 16 wherein the ultrasonic compressional wave energy source includes means for repetitively pulsing continuously the energy on and off at a rate above a predetermined minimum to enhance repelling of the pests.

21. The combination of claim 20 wherein the energy is pulsed on and off at a rate of between 20 and 300 times per second.

22. The combination of claim 16 wherein the compressional wave energy source includes an electric to compressional wave transducer crystal having a resonant frequency and an acoustic resonant chamber having approximately the same resonant frequency as the crystal coupled to the crystal, the crystal and chamber being designed to produce the compressional wave energy at a frequency determined by the crystal resonant frequency in response to the crystal being excited by an electric power source in the device.

23. The combination of claim 22 wherein the crystal is connected in a positive feedback circuit including capacitance and resistance means for controlling the voltage applied to the crystal, and means for periodically enabling and disabling the positive feedback circuit, the resistance means and capacitance means being connected to the crystal to cause the crystal to oscillate with a variable amplitude envelope while the positive feedback circuit is enabled.

24. The combination of claim 23 wherein the capacitance means is connected in series with the crystal and terminals of amplifier means comprising the positive feedback circuit.

25. The combination of claim 23 wherein the resonant chamber resonates at the frequency of the compressional wave energy.

26. The combination of claim 23 wherein the positive feedback circuit derives a waveform portion that is in the hearing range of most persons, the crystal having a response enabling it to transduce the waveform portion with sufficient amplitude to enable most persons to hear it when the transducer is placed close to an ear of the persons.

27. Apparatus for repelling pests such as fleas, ticks and other similar creatures, comprising an electric wave to compressional wave energy transducer source designed to resonate at a frequency in the ultrasonic spectrum that repels the pests, the transducer being connected in a circuit with a shaping network for controlling the voltage applied to the transducer and selectively opened and closed switching means, the circuit including sufficient positive feedback, while the switching means is closed, to cause the transducer to oscillate at the resonant frequency thereof, and means for closing the switching means with a duty cycle no greater than 30% and an acoustic resonant cavity having a resonant frequency approximately equal to the resonant frequency of the transducer, the cavity being acoustically coupled to the transducer.

28. The apparatus of claim 27 wherein the transducer comprises a piezoelectric crystal, the shaping network including a series capacitor and a shunt resistor.

29. The apparatus of claim 27 wherein the transducer comprises a piezoelectric crystal.

30. The apparatus of claim 27 wherein the resonant chamber resonates at the frequency of the compressional wave energy.

31. The apparatus of claim 27 wherein the switching means is open and closed at a rate between 22 and 300 Hz.

32. The apparatus of claim 27 further including a battery power supply for energizing the circuit.

* * * * *

UNITED STATES PATENT AND TRADEMARK OFFICE
CERTIFICATE OF CORRECTION

PATENT NO. : 4,669,424

DATED : June 2, 1987

INVENTOR(S) : Frank J. Bianco and Oscar Jimenez

It is certified that error appears in the above-identified patent and that said Letters Patent is hereby corrected as shown below:

IN THE CLAIMS:

Claim 14, line 1, change "10" to --2--.

Claim 16, line 8, change "that" to --the--.

Claim 20, line 3, change "pulsing continuously" to --continuously pulsing--.

Claim 31, line 2, change "22" to --20--.

Signed and Sealed this

Twentieth Day of October, 1987

Attest:

DONALD J. QUIGG

Attesting Officer

Commissioner of Patents and Trademarks